United States Patent [19]

Hakata et al.

[11] Patent Number: 5,731,085
[45] Date of Patent: Mar. 24, 1998

[54] SPHERICAL MAGNETIC COMPOSITE PARTICLES

[75] Inventors: Toshiyuki Hakata; Shigeru Takaragi, both of Hiroshima, Japan

[73] Assignee: Toda Kogyo Corporation, Japan

[21] Appl. No.: 187,045

[22] Filed: Jan. 27, 1994

[30] Foreign Application Priority Data

Jan. 29, 1993 [JP] Japan .................. 5-034407

[51] Int. Cl.⁶ .................. B32B 5/16; G11B 5/66
[52] U.S. Cl. .................. 428/402; 428/407; 428/694 BA; 428/900
[58] Field of Search .................. 428/694 BA, 403, 428/407, 900, 327, 402

[56] References Cited

U.S. PATENT DOCUMENTS

| | | | |
|---|---|---|---|
| 4,578,313 | 3/1986 | Ito et al. | 428/403 |
| 4,803,131 | 2/1989 | Saito et al. | 428/694 BA |
| 5,321,060 | 6/1994 | Oliver et al. | 523/220 |

FOREIGN PATENT DOCUMENTS

| | | |
|---|---|---|
| 0 468 887 A1 | 1/1992 | European Pat. Off. . |
| 60-150057 | 8/1985 | Japan . |
| 62-250172 | 10/1987 | Japan . |
| 63-18096 | 1/1988 | Japan . |
| 2-13969 | 1/1990 | Japan . |

OTHER PUBLICATIONS

Patent Abstracts of Japan, vol. 14 No. 389 (P–1095) 22 Aug. 1990. Abstract.

Chemical Abstracts, vol. 91 No. 18, 29 Oct. 1979, Abstract # 150236z. Stadnik et al "Magnetic properties of ferromagnetic . . . " p. 648; column 2.

*Primary Examiner*—H. Thi Le
*Attorney, Agent, or Firm*—Nixon & Vanderhye

[57] ABSTRACT

Disclosed are herein spherical magnetic particles comprising magnetic particles, a thermosetting resin and carbon which is derived from the thermosetting resin by carbonizing at least a part of the thermosetting resin, and having an average particle diameter of 1 to 1000 μm.

8 Claims, 4 Drawing Sheets

1 μm

10μm

10μm

1μm

10μm

10μm

10μm

5μm

5μm

SPHERICAL MAGNETIC COMPOSITE PARTICLES

BACKGROUND OF THE INVENTION

The present invention relates to spherical magnetic particles and a process for producing the same. More particularly, the present invention relates to spherical magnetic particles having a high strength, a large saturation magnetization and a high electric conductivity, and a process for producing the same.

The spherical magnetic particles having an electric conductivity according to the present invention are mainly used as a material for a developer for electrostatic latent image photographs such as a magnetic carrier and a magnetic toner, a material for an electromagnetic wave absorber, an electromagnetic wave shielding material, a material for a brake shoe, a polishing material, a lubricating material, a material for a magnetic separator, a material for a magnet, an ion exchanging resin material, a material for an immobilized enzyme carrier, a displaying material, a damping material, a coating material, a coloring material for rubber and plastic, a filling material, and a reinforcing material.

In the above-described fields, various attempts have also been made at a combination of different materials, development of a material having different properties at the same time, etc., and magnetic particles which have both magnetism and electric conductivity.

As particles which have both magnetism and electric conductivity, metal powders such as iron powder and metal oxide powders such as ferrite powder are conventionally known.

Various methods are known for providing electric conductivity for such as (1) coating the surfaces of metal particles, ceramic particles or plastic particles with a metal by sputtering or CVD (Japanese Patent Application Laid-Open (KOKAI) No. 62-250172 (1987)), (2) coating the surfaces of ceramic particles or plastic particles with a metal by electroless plating (Japanese Patent Application Laid-Open (KOKAI) No. 63-18096 (1988)), (3) depositing resin particles with carbon black adhered thereto onto the surfaces of magnetic particles by mechanical impact (Japanese Patent Application Laid-Open (KOKAI) No. 2-13969 (1990)), and adhering fine electrically conductive particles to the surfaces of composite particles of magnetic particles and a binder resin (Japanese Patent Application Laid-Open (KOKAI) No. 60-150057 (1985)).

Japanese Patent Application Laid-Open (KOKAI) No. 62-250172 (1987) discloses a method of coating ultrafine powder comprising the steps of: (a) fluid jet-mill-treating ultrafine metal powder, ceramic powder or plastic powder which an average particle diameter of the primary particles is 100 Å to 1 µm in an inert atmosphere so as to disperse the resultant primary particles, and carrying the primary particles in an inert gas stream; (b) heat-treating the dispersed ultrafine powder under a reduced pressure in an inert atmosphere; (c) coating the heat-treated ultrafine powder with metal, ceramic material or plastic by sputtering in a sputtering chamber in which a metal, ceramic or plastic target is disposed perpendicularly and the ultrafine powder is dropped in parallel with the target; and (d) repeating the steps (a), (b) and (c).

Japanese Patent Application Laid-Open (KOKAI) No. 63-18096 (1988) discloses a method of coating ultrafine powder with a metal comprising the steps of: pulverizing ultrafine ceramic or plastic powder having an average particle diameter of 100 Å to 1 µm onto primary particles; treating the surfaces of the particles with plasma; sensitizing the surfaces of the particles with a tin compound; activating the surfaces of the particles with a palladium compound; imparting electric conductivity to the powder by electroless plating; and repeating the electroplating treatment using a suspended aqueous solution and dispersing treatment using ultrasonic waves.

Japanese Patent Application Laid-Open (KOKAI) No. 2-13969 (1990) discloses a method of producing a coated carrier containing carbon black in a coating layer comprising the steps of: mixing magnetic particles having an average particle diameter of 20 to 200 µm as a core material with resin particles which have an average particle diameter of not more than 1/10 of that of the magnetic particles and to which carbon black is adhered in advance, and uniformly stirring the resultant mixture; and repeatedly applying an impact force to the mixture so as to fix the resin particles with the carbon black adhered thereto onto the magnetic particles.

However, in the particles produced by method (1) or (2), the conductive layer coated on the surface of the particles is easily peeled off by mechanical shear, so that the electric conductivity is lowered with the passage of time. In addition, method (1), especially, requires an expensive treating and a specific apparatus, and method (2) suffers from a problem of disposal of the electroplating waste liquor.

In the particles produced by method (3) or (4), the conductive layer coated on the surface of the particles is also easily peeled off by a mechanical shear. In addition, the particles produced by the method (4) have a small saturation magnetization because the content of magnetic particles is small.

Since metal powder such as iron powder is indeterminate, it is difficult to pack at the time of use. Since such iron powder is not adequately dispersed in a vehicle, its functional uses cannot be displayed fully. In addition, since such metal powder is easily oxidized, it is difficult to handle. Some metal oxide powder such as ferrite powder is spherical so that it is stable in an air, but the electrical conductivity is not so high.

Accordingly, spherical magnetic particles which have a high strength, a large saturation magnetization and a high electric conductivity and which are free from peeling or separation of an electrical conductive material are now strongly demanded.

It has been found that by heat-treating composite particles composed of magnetic particles and a thermosetting resin at a temperature of not lower than 350° C. in an inert atmosphere so as to carbonize at least a portion of the thermosetting resin in the composite particles, the obtained spherical magnetic composite particles have an average particle diameter of 1 to 1000 µm and have a high strength, a large saturation magnetization and a high electric conductivity.

SUMMARY OF THE INVENTION

It is an object of the present invention to provide spherical magnetic composite particles which have a high strength, a large saturation magnetization and a high electric conductivity.

It is another object of the present invention to provide spherical magnetic particles which can maintain a large saturation magnetization and a high electric conductivity for a long period of time.

It is still another object of the present invention to provide spherical magnetic particles which have good packing properties, and which are easy to disperse when they are kneaded with a resin or when they are mixed with a vehicle.

To achieve these objectives, in a first aspect of the present invention, there are provided spherical magnetic particles comprising magnetic particles, a thermosetting resin and carbon which is derived from the thermosetting resin by carbonizing at least a part of the thermosetting resin, and having an average particle diameter of 1 to 1000 µm.

In a second aspect of the present invention, there are provided spherical magnetic particles comprising magnetic particles and carbon which is derived from the thermosetting resin, and having an average particle diameter of 1 to 1000 µm.

In a third aspect of the present invention, there is provided a process for producing spherical magnetic particles as defined in the first aspect, comprising the step of heat-treating composite particles composed of magnetic particles and a thermosetting resin at a temperature of not lower than 350° C. in an inert atmosphere.

DETAILED DESCRIPTION OF THE INVENTION

Figure 1:
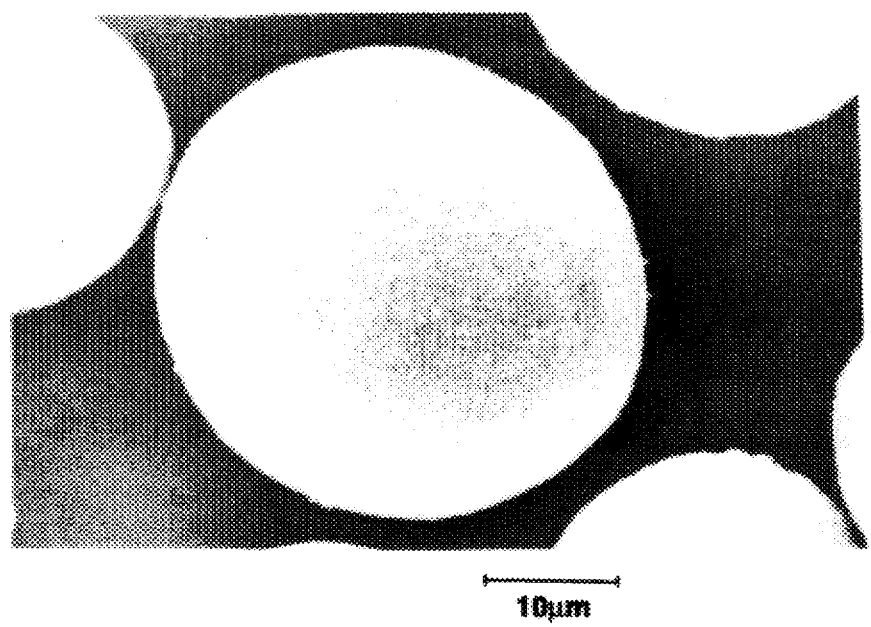
FIG. 1 is a scanning electron micrograph (×2000) showing the structure of the composite particles obtained in Example 1.

The content of the magnetic particles (ferromagnetic particles) in the spherical magnetic particles of the present invention is 80 to 98 wt %, preferably 85 to 95 wt %. If it is less than 80 wt %, the saturation magnetization is insufficient. On the other hand, if it exceeds 98 wt %, since the content of the thermosetting resin is too low, the bond between the ferromagnetic particles is so weak as to reduce the strength of the spherical magnetic particles.

The carbon content in the spherical magnetic particles of the present invention is 2 to 15 wt %, preferably 2 to 10 wt %. If it is less than 2 wt %, the conductivity is insufficient and the strength of the spherical magnetic particles is reduced. On the other hand, if it exceeds 15 wt %, the saturation magnetization is lowered.

The content of the thermosetting resin in the spherical magnetic particles of the present invention is not more than 13 wt %, preferably not more than 10 wt %.

The average particle diameter of the spherical magnetic particles according to the present invention is 1 to 1000 µm. By use of the spherical magnetic particles of the present invention, the average particle diameter can be properly selected in the above-mentioned range. For example, in the case of the developer such as a toner and a carrier, the average particle diameter is preferably 1 to 500 µm, more preferably 1 to 300 µm, still more preferably 1 to 100 µm. If the average particle diameter is less than 1 µm, such particles are apt to agglomerate and to produce secondary particles. On the other hand, if the average particle diameter is more than 1000 µm, the particles have such a low mechanical strength that they are apt to be broken when they are used as a filler.

The spherical magnetic particles of the present invention are approximately spherical, so that they are excellent in dispersibility, fluidity and mechanical strength.

Examples of the thermosetting resin used in the present invention are a phenol resin and an epoxy resin.

The composite particles composed of magnetic particles and a thermosetting resin which are used in the present invention are produced in the following manner.

(I) In the case of a phenol resin:
(1) phenols and aldehydes are reacted and cured in an aqueous medium in the presence of magnetic particles and a basic catalyst (U.S. Pat. No. 5,108,862 and Japanese Patent Application Laid-Open (KOKAI) No. 4-100850); or
(2) uncured phenol resins are cured in an aqueous medium in the presence of magnetic particles (Japanese Patent Application Laid-Open (KOKAI) No. 4-100850).

(II) In the case of an epoxy resin:
(1) bisphenols and epihalohydrins are reacted and cured in an aqueous alkali medium in the presence of magnetic particles (Japanese Patent Application Laid-Open (KOKAI) No. 4-11624); or
(2) uncured epoxy resins are cured in an aqueous medium in the presence of magnetic particles (Japanese Patent Application Laid-Open (KOKAI) No. 4-11624).

The thus-obtained composite particles are heat-treated at a temperature of not lower than 350° C. in an inert atmosphere, thereby producing spherical magnetic particles with at least a part carbonized.

As the magnetic particles used in the present invention, magnetic iron oxide particles such as magnetite particles [$FeO_x \cdot Fe_2O_3$ ($0 < x \leq 1$)] and γ-iron oxide particles; ferrite particles having a spinel structure and containing at least one metal (M) other than iron (e.g., Mn, Ni, Zn, Mg and Cu) [$M^{2+}_x Fe^{2+}_{1-x} Fe^{3+}_2 O_4$ ($0 < x \leq 1$)]; magneto-plumbite ferrite particles such as barium ferrite particles; and iron or iron alloy particles having oxide layers on the surfaces may be exemplified. The shape of the magnetic particles as a raw material is granular, spherical or acicular. Although the magnetic particles such as iron particles are usable when a specially high saturation magnetization is required, ferrite particles having a spinal structure and containing magnetic iron oxide particles such as g-iron oxide particles and magneto-plumbite particles such as barium ferrite are preferably used when chemical stability is taken into consideration.

The average particle diameter of the magnetic particles used in the present invention is preferably 0.1 to 10 µm, and when the dispersion of the magnetic particles in an aqueous medium and the strength of the spherical composite particles produced are taken into consideration, the average particle diameter of the magnetic particles as a raw material is preferably 0.05 to 5 µm.

It is preferable that the magnetic particles as a raw material are subjected to lipophilic treatment in advance. If they are not subjected to lipophilic treatment in advance, it may be sometimes difficult to produce spherical composite particles.

In order to subject the magnetic particles to lipophilic treatment, for example, they are treated with a coupling agent such as a silane coupling agent and a titanate coupling agent, or they are dispersed in an aqueous solvent containing a surfactant so that the surfactant is adsorbed onto the surfaces of the particles.

As the silane coupling agent, those having a hydrophobic group, an amino group and an epoxy group are usable. Examples of the coupling agent having a hydrophobic group are vinyltrichlosilane, vinyltriethoxysilane, vinyl tris(β-methoxy)silane.

As examples of the silane coupling agent having an amino group, γ-aminopropyltriethoxysilane, N-β-(aminoethyl)-γ-aminopropyltrimethoxysilane, N-β-(aminoethyl)-γ-aminopropylmethyldimethoxysilane, N-phenyl-γ-aminopropyltrimethoxysilane may be cited.

As the silane coupling agent having an epoxy group, γ-glycidoxypropylmethyldiethoxysilane, γ-glycidoxypropyltrimethoxysilane, and β-(3,4-epoxycyclohexyl)trimethoxysilane may be exemplified.

As the titanate coupling agent, isopropyltriisostearoyl titanate, isopropyltridodecylbenzenesulfonyl titanate, isopropyltris(dioctyl pyrophosphate) titanate, etc. are usable.

The amount of the coupling agent is preferably 0.1 to 5.0 parts by weight based on 100 parts by weight of the magnetic particles as a raw material.

As the surfactant, a commercially available surfactant is usable. Surfactants having a functional group which can be combined with the magnetic particles as a raw material or the hydroxyl group on the surfaces of the magnetic particles as a raw material are preferable, and cationic or anionic surfactants are preferable.

The objectives of the present invention can be achieved by adopting either of the above-described methods in order to subject the magnetic particles to lipophilic treatment, but a method of treating the magnetic particles with a silane coupling agent having an amino group or an epoxy group is preferable from the point of view of the adhesion of the magnetic particles to a thermosetting resin.

As the phenols used in the present invention, compounds having a phenolic hydroxyl group, for example, phenol; alkyl phenols such as m-cresol, p-cresol, p-tert-butylphenol, o-propylphenol, resolcinol and bisphenol A; and halogenated phenols which are produced by substituting a part or the whole part of the benzene ring or the alkyl group by a chlorine atom or a bromine atom are usable. Among these, phenol is the most preferable. When a compound other than phenol is used as the phenols used in the present invention, it may be sometimes difficult to produce composite particles, or the composite particles produced may be sometimes indeterminate. From the point of view of shape, phenol is the most preferable.

As examples of the aldehydes used in the present invention, formaldehydes in the form of formalin or paraaldehyde, and furfurals may be cited, and the formaldehydes are especially preferable.

The molar ratio of the aldehydes with respect to the phenols is preferably 1 to 2, more preferably 1.1 to 1.6. If the molar ratio of the aldehydes to the phenols is less than 1, the composite particles may be difficult to produce, or even if the composite particles are produced, the progress of curing of the resin may be so slow that the strength of the particles produced may be low. On the other hand, if the molar ratio of the aldehydes to the phenols is more than 2, the unreacted aldehydes remaining in the aqueous medium after reaction is apt to increase.

The content of the magnetic particles is preferably 0.5 to 200 weight times of that of the phenols. More preferably, it is 4 to 100 weight times from the point of view of the strength of the spherical composite particles produced. In other words, the amount of phenols used is 0.5 to 200 parts by weight, more preferably 1 to 25 parts by weight based on 100 parts by weight of the magnetic particles. The amount of aldehydes used is 0.5 to 400 parts by weight, more preferably 0.55 to 320 parts by weight based on 100 parts by weight of the magnetic particles.

As examples of the uncured phenol resin, a commercial Novolak type: PHENOLITE TD-2131 (produced by Dai-Nippon ink Chemical Industry Co., Ltd.) and a Resol type: PLYOPHEN 5023 (produced by Dai-Nippon ink Chemical industry Co., Ltd.) may be exemplified.

As the basic catalyst used in the present invention, the basic catalysts used in the production of an ordinary resol resin are usable. They are, for example, ammonia water, hexamethylenetetramine, and alkyl amines such as dimethylamine, diethyltriamine and polyethyleneimine. The molar ratio of the basic catalyst with respect to the phenol is preferably 0.02 to 0.3.

The phenols and aldehydes are reacted and at the same time the resin is cured in a temperature range of 70° to 90° C., and the temperature is lowered to not higher than 40° C. In this way, a water dispersion containing the spherical composite particles is obtained. The reaction time is preferably 1 to 5 hours.

In the case of using an uncured phenol resin, an aqueous medium containing the magnetic particles and the uncured phenol resin is stirred at 70° to 90° C. for about 1 to 8 hours in the presence of a curing agent so as to cure the uncured phenol resin.

The curing agent is not specifically restricted if only it is a phenol resin-curing agent. For example, basic catalysts such as the above amines are usable.

As the bisphenols which is an ingredient of the epoxy resin used in the present invention, compounds having at least two phenolic hydroxyl groups such as bisphenol A, bisphenol F, bisphenol S and resorcin are usable.

As the epihalohydrins which is another ingredient of the epoxy resin used in the present invention, epichlorohydrin, epibromohydrin, epiiodohydrin, etc. are usable.

The amount of bisphenols used is 0.5 to 25 parts by weight based on 100 parts by weight of the magnetic particles. The amount of epihalohydrins used is 0.3 to 20 parts by weight based on 100 parts by weight of the magnetic particles. The molar ratio of the bisphenols used and the epihalohydrins used is 0.5 to 1.0:1.0.

As the unreacted epoxy resin, epoxy compounds having at least two epoxy groups in a molecule of the glycidyl ether at both ends of bisphenol A or the glycidyl ether at both ends of polyethylene glycol may be exemplified.

The epoxy resin composite material used in the present invention is obtained by carrying out the polymerization reaction in an aqueous alkali medium containing the magnetic particles and the bisphenols and the epihalohydrins in the presence of the curing agent at a temperature to 60° to 90° C. for about 1 to 5 hours under stirring, or the curing reaction in an aqueous medium containing the magnetic particles and the uncured epoxy resin in the presence of the curing agent at a temperature to 60° to 90° C. for 1 to 8 hours under stirring.

The curing agent is not specifically restricted if only it is a epoxy resin-curing agent. For example, amines are usable.

After the aqueous dispersion is filtered and the solid substance is separated by a conventional method, the separated solid substance is washed and dried, thereby obtaining the spherical composite particles.

A suspension stabilizer may be added, if necessary, in the reaction of the present invention.

Examples of the suspension stabilizer are hydrophilic organic compounds such as carboxylmethyl cellulose and polyvinyl alcohol, fluorine-containing compounds such as calcium fluoride, and inorganic salts which are insoluble in water such as calcium sulfate.

The heat treatment of the composite particles used in the present invention are carried out in an inert atmosphere at a temperature which is necessary for decomposing and carbonizing the thermosetting resin such as a phenol resin and an epoxy resin. The temperature is not lower than 350° C.

In order to carbonize a part of the thermosetting resin such as a phenol resin and an epoxy resin, the composite particles are heat-treated at a temperature of not lower than 350° C., preferably not lower than 370° C. for not less than about 0.5 hour, preferably 1 to 3 hours.

In order to carbonize the whole part of the thermosetting resin such as a phenol resin and an epoxy resin, the composite particles are preferably heat-treated at a temperature of not lower than 400° C., more preferably not lower than 450° C. for not less than about 0.5 hour, preferably 1 to 3 hours.

As the heat-treating furnace, either of a stationary heat-treating furnace and a rotary heat-treating furnace may be used, but in order to prevent agglomeration of particles, a rotary heat-treating furnace is preferable.

The inert atmosphere in the present invention is prepared by causing an inert gas such as helium, argon and nitrogen to flow into the heat-treating furnace. Nitrogen is preferable from the point of view of cost.

It is necessary that the flow rate of the inert gas is preferably not less than 1 liter/min in order to prevent the oxidation of the magnetic particles which may occur when iron particles or magnetite particles is used as the magnetic particles.

The heat-treating temperature in the present invention is a temperature which is necessary for decomposing the thermosetting resin and carbonizing at least a part thereof, that is, not lower than 350° C. If the heat-treating temperature is lower than 350° C., the carbonization of the thermosetting resin is not proceeded so that it is impossible to obtain a high electric conductivity. In case where the temperature is not lower than 400° C., the carbonization of the thermosetting resin is sufficient. When the saturation magnetization is taken into consideration, the upper limit of the heat-treating temperature is preferably 800° C. If the temperature exceeds 800° C., the magnetic particles are apt to be reduced by the thermosetting resin. For example, in the case of using magnetite, the reduction of the magnetite proceeds and as a result, a part or the whole thereof becomes wustite or iron, which is easily oxidized. When the magnetic particles are oxidized, the saturation magnetization is lowered.

What is the most important in the present invention is the fact that when the spherical composite particles composed of magnetic particles and a thermosetting resin and having an average particle diameter of 1 to 1000 μm are heat-treated in an inert atmosphere at a temperature of not lower than 350° C. so as to carbonize at least a part of the thermosetting resin, it is possible to produce spherical magnetic particles which are either of (1) a composite material composed of the magnetic particles, carbon derived from the thermosetting resin and the thermosetting resin and (2) a composite material composed of the magnetic particles and carbon derived from the thermosetting resin, and which have an average particle diameter of 1 to 1000 μm, and that the spherical magnetic particles have a high strength, a large saturation magnetization and a high electric conductivity.

Because the resin constituting the spherical composite particles is a thermosetting resin, which has a high actual carbon ratio, and the amount of the magnetic particles in the spherical composite particles is 80 to 98 wt %, the spherical magnetic particles of the present invention exhibit a large saturation magnetization and a high electric conductivity.

The present inventors consider that because spherical composite particles which are uniformly and firmly combined by the thermosetting resin so that the magnetic particles have the close-packed structure, are used as the particles to be heat-treated, the spherical magnetic particles obtained have also the close-packed structure, that the spherical magnetic particles of the present invention has a high strength.

The saturation magnetization of the spherical magnetic particles of the present invention is as large as 40 to 150 emu/g, especially 65 to 150 emu/g.

The electric conductivity of the spherical magnetic particles of the present invention is as high as $10^{-6}$ to $10^{-3}$ S/cm in a DC field to which a voltage of 15 V is applied.

The sphericity of the spherical magnetic particles of the present invention is expressed by the ratio (l/w) of the major axial diameter (l) and the minor axial diameter (w) of one particle measured by using an SEM photograph of at least 200 particles. The ratio (l/w) is 0.7 to 1.4 ($0.7 \leq l/w \leq 1.4$), preferably 0.8 to 1.3 ($0.8 \leq l/w \leq 1.3$).

The spherical magnetic particles of the present invention have a high strength. To prove this, 50 g of the particles are charged into a 100-ml glass bottle and capped, and the bottle is shaken for 60 minutes by a paint conditioner. When the particle size distribution of the particles after shaking is observed by a laser diffraction particle size distribution analyzer (manufactured by Horiba Seisakusho Co., Ltd.) and compared with that of the samples before shaking, there is little change in the particle size distribution. If the strength of the spherical magnetic particles of the present invention is represented by the ratio of the difference between the average particle diameter (a) before shaking and the average particle diameter (b) after shaking to the average particle diameter (a) before shaking, it is less than 0.1, i.e. [(a−b)/a<0.1], preferably not more than 0.08, i.e. [(a−b)/a<0.08].

Since the spherical magnetic particles of the present invention have a high strength, a large saturation magnetization and a high electric conductivity, they are suitable as a material of a developer for electrostatic latent image photographs such as a magnetic carrier and a magnetic toner, a material for an electromagnetic wave absorber, an electromagnetic wave shielding material, a material for a brake shoe, a polishing material, a lubricating material, a material for a magnetic separator, a material for a magnet, an ion exchanging resin material, a material for an immobilized enzyme carrier, a displaying material, a coating material, a coloring material for rubber and plastic, a filling material, and a reinforcing material.

Since the spherical magnetic particles of the present invention have a high strength, it is possible to maintain a large saturation magnetization and a high conductivity for a long term. In addition, since the spherical magnetic particles are spherical, the packing property is good and they show an excellent dispersibility when they are kneaded with a resin and when they are mixed with a vehicle.

EXAMPLES

The present invention will now be described in more detail with reference to the following examples, but the present invention is not restricted to those examples and various modifications are possible within the scope of the invention.

(1) The average particle diameter is expressed by the values measured by a laser diffraction particle size distribution analyzer (manufactured by Horiba Seisakusho Co., Ltd.), and the shapes of the particles were observed by a scanning electron microscope (JMS-5300, manufactured by Japan Electron Optics Laboratory Co., Ltd.).

(2) The carbon content C in the sample was obtained by using Carbon/Sulfur Analyzer EMIA-2200" (manufactured by Horiba Seisakusho Co., Ltd.).

(3) The saturation magnetization is expressed by the value measured by using Vibrating Sample Magnetometer VSM-3S-15 (manufactured by Toei Kogyo Co., Ltd.) while applying an external magnetic field of 10 kOe.

(4) The conductivity is expressed by the value measured by Wheatstone Bridge 2768 (manufactured by Yokogawa Electric Works, Limited).

(5) The sphericity is expressed by the ratio (l/w) of the major axial diameter (l) and the minor axial diameter (w) of one particle measured by using an SEM photograph of at least 200 particles.

(6-1) In order to judge the strength, 50 g of the particles were charged into a 100-ml glass bottle and capped, and the bottle was shaken for 60 minutes by a paint conditioner. The particle size distribution of the particles after shaking was observed by a laser diffraction particle size distribution analyzer (manufactured by Horiba Seisakusho Co., Ltd.) and compared with that of the samples before shaking. The strength was judged in accordance with the following criteria:

A: No change or little change

B: Slight change

C: Change

The spherical magnetic particles of the present invention are desired to have the criteria A.

(6-2) The strength is also expressed by the ratio $[(a-b)/a]$ of the difference between the average particle diameter (a) before they were shaken by the laser diffraction particle size distribution analyzer (manufactured by Horiba Seisakusho Co., Ltd.) and the average particle diameter (b) after they were shaken for 60 minutes by a paint conditioner, to the average particle diameter (a) before shaking. As the strength of the spherical magnetic particles of the present invention, it is desirable that $[(a-b)/a<0.1]$.

(7) The remaining of the phenol resin in the spherical magnetic particles was determined by the following.

After the specimen (spherical magnetic particles) was pulverized, 1 g of the pulverized substance was charged into a test tube and capped, and the test tube was heated with direct fire. After condensing the decomposed gas in the upper portion of the test tube by cooling, 3 ml of distilled water was charged thereinto and water was boiled to dissolve the obtained condensate, and filtered. To 1 ml of the obtained filtrate, a small amount of Millon's reagent (produced by Kanto Chemical Co., Ltd.). The color of the resultant solution is observed and by the presence of the phenol resin in the spherical magnetic particles, the solution turns red.

(8) The remaining of the epoxy resin in the spherical magnetic particles was determined by the following.

After the specimen (spherical magnetic particles) was pulverized, 1 g of the pulverized substance was charged into a test tube and 100 ml of conc. sulfuric acid were charged thereinto. After stirring at R.T. and filtering, to 1 ml of the obtained solution, a few drops of 37% formalin was added. The color of the resultant solution is observed that after orange colored solution has been poured into water, the orange color of the solution is changed to blue by the presence of the epoxy resin in the spherical magnetic particles.

(9) The remaining of the thermosetting resin in the spherical magnetic particles is calculated by a specific gravity (d) of the spherical composite particles and the content of the magnetic particles as a raw material in the spherical magnetic particles, which is calculated from each saturation magnetization of the spherical composite particles and the magnetic particles.

$$d=(x+y+z)/[(x/p)+(y/q)+(z/r)]$$

$$x+y+z=100$$

$$x=\sigma_p/\sigma_i$$

wherein 'x' represents the content of the magnetic particles as a raw material in the spherical magnetic particles, 'y' represents the content of the thermosetting resin in the spherical magnetic particles, 'z' represents the content of carbon in the spherical magnetic particles, 'p' represents the specific gravity of the magnetic particles as a raw material in the spherical magnetic particles, 'q' represents the specific gravity of the thermosetting resin in the spherical magnetic particles, 'r' represents the specific gravity of carbon in the spherical magnetic particles, $\sigma_p$ represents the saturation magnetization of the spherical composite particles, and $\sigma_i$ represents the saturation magnetization of the magnetic particles.

<Production of spherical composite particles composed of magnetic particles and cured phenol resin>

Examples 1 to 3

Example 1

400 g of spherical magnetite particles having an average particle diameter of 0.24 μm were charged into a Henschel mixer and adequately stirred. Thereafter, 2.0 g of silane coupling agent (KBM-403, produced by Shin-etsu Chemical Industry Co., Ltd.) was added, and the temperature was raised to about 100° C. By stirring the mixture adequately for 30 minutes, the spherical magnetite particles coated with the coupling agent were obtained.

Separately, 40 g of phenol, 60 g of 37% formalin, 400 g of magnetite which had been subjected to lipophilic treatment in advance, 12 g of 28% ammonia water and 40 g of water were stirred in a 1-liter four-necked flask and the temperature was raised to 85° C. in 40 minutes. The phenol and formalin in the resultant mixture were reacted and cured at a temperature of 85° C. for 180 minutes, thereby producing a composite material composed of the magnetite particles and a cured phenol resin.

The contents in the flask were then cooled to a temperature of 30° C., and 0.5 liter of water was added thereto. The supernatant liquid was removed and the precipitate in the lower layer was washed with water and air-dried. The precipitate was further dried at a temperature of 50° to 60° C. under a reduced pressure (not higher than 50 mm Hg) to obtain composite particles (hereinunder referred to as "composite particles I").

The composite particles I obtained had an average particle diameter of 35 μm and each particle had a spherical shape approximate to the complete spherical shape, as shown in the scanning electron micrograph (×2000) in FIG. 1.

The main production conditions and the properties of the composite particles I are shown in Table 1.

Example 2

Composite particles (hereinunder referred to as "composite particles II") were obtained in the same way as in Example 1 except that the magnetite was not subjected to lipophilic treatment and that the amount of phenol and the amount of water were changed.

The main production conditions and the properties of the composite particles II are shown in Table 1.

Example 3

Composite particles (hereinunder referred to as "composite particles III") were obtained in the same way as in Example 1 except that the kind and the amount of an agent for the lipophilic treatment were changed and that the amount of water were changed.

The main production conditions and the properties of the composite particles III are shown in Table 1.

<Heat-treatment of composite particles>

Examples 4 to 7, Comparative Example 1

Example 4

1 kg of the composite particles I obtained in Example 1 were charged into a rotary heat-treating furnace having a capacity of 10 liter, and the temperature of the interior was raised to 450° C. while causing nitrogen gas to flow therein at a rate of 1 liter/min. After one hour of heat-treatment, electrically conductive magnetic particles IV were produced.

Figure 2:
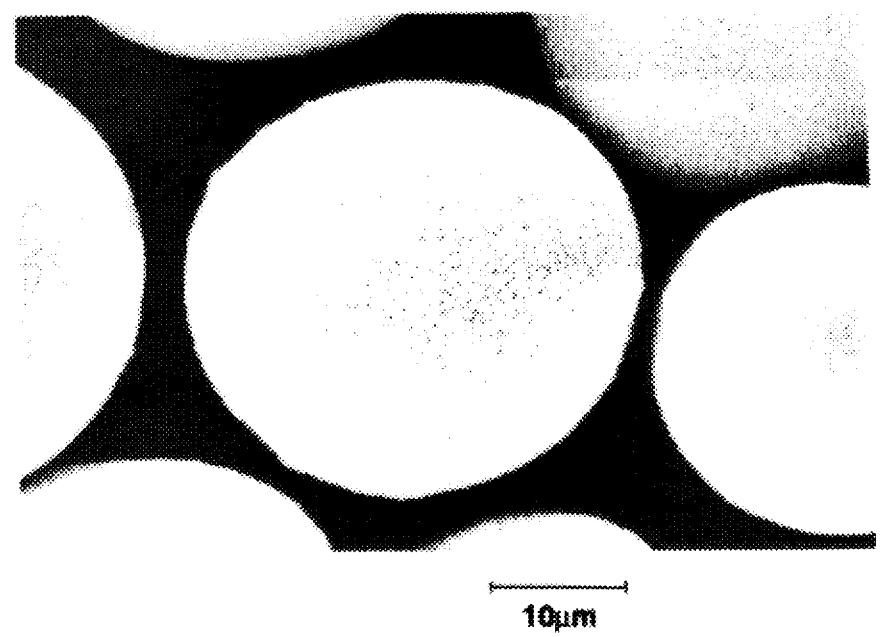
FIG. 2 is a scanning electron micrograph (×2000) showing the structure of the electrically conductive magnetic particles obtained in Example 4.

The scanning electron micrograph (×2000) of the electrically conductive magnetic particles IV produced is shown in FIG. 2, and the main production conditions and the properties thereof are shown in Table 2.

Since there were determined no phenol from thus-obtained electrically conductive magnetic particles IV, it was proved that the phenol resin in the composite particles was carbonized, completely.

50 g of the electrically conductive magnetic particles IV were charged into a 100-cc glass bottle and capped, and the bottle was shaken for 3 hours by a paint conditioner (manufactured by RED DEVIL Limited). When the saturation magnetization and the conductivity of the particles after shaking were measured, the initial values were approximately maintained. From this fact, it was proved that the electrically conductive magnetic particles IV were hardly broken and that the strength was very high.

Examples 5 to 10

Spherical magnetic particles V to X were produced in the same way as in Example 4 except that the kind of the composite particles used and the heat-treating conditions were varied.

The main production conditions and the properties of the spherical magnetic particles V to X are shown in Table 2.

Figure 3:
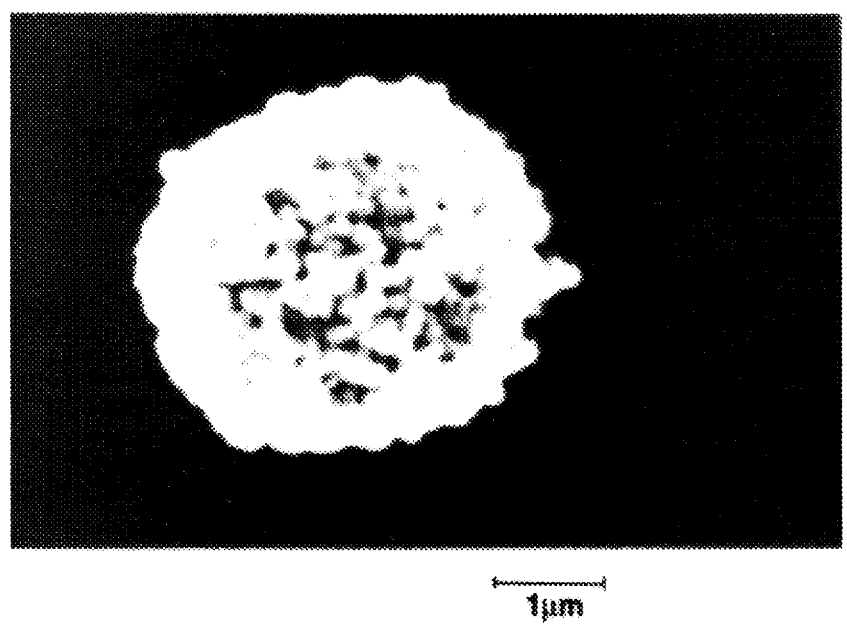
FIG. 3 is a scanning electron micrograph (×15000) showing the structure of the electrically conductive magnetic particles obtained in Example 5.

The scanning electron micrograph (×15000) of the spherical electrically conductive magnetic particles V produced in Example 5 is shown in FIG. 3.

Figure 4:
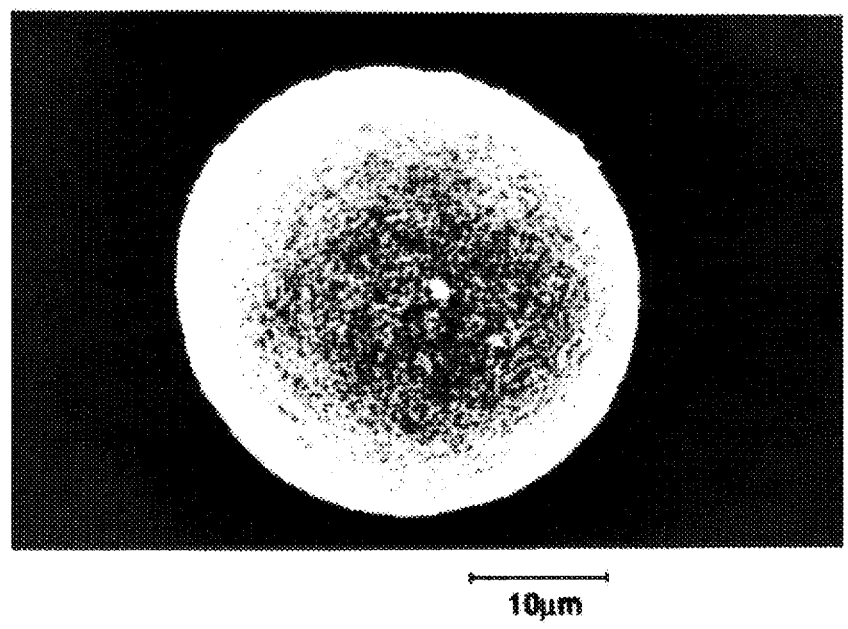
FIG. 4 is a scanning electron micrograph (×3500) showing the structure of the composite particles obtained in Example 8.

The scanning electron micrograph (×3500) of the spherical magnetic particles VIII produced in the Example 8 is shown in FIG. 4.

Since there were determined no phenol from each of the thus-obtained spherical electrically conductive magnetic particles V to VII in the Examples 5 to 7, it was proved that the phenol resin in each of the composite particles was carbonized, completely.

On the other hand, there was determined phenol from each of the thus-obtained spherical magnetic particles VIII to X in the Examples 8 to 10, it was proved that the phenol resin in each of the composite particles was partially carbonized and the content of the remaining phenol resin in each of the spherical magnetic particles was not more than 13 wt %.

When the saturation magnetizations and the conductivities of the spherical magnetic particles V to X produced in Examples 5 to 10 were measured after they had been shaken in the same way as in Example 4, the initial values were approximately maintained. From this fact, it was proved that the spherical magnetic particles V to X were hardly broken and that the strength was very high.

Comparative Example 1

The magnetic particles used in Example t were kneaded with a commercially available polyethylene (Admer NS 101, produced by Mitsui Petrochemical Industries, Ltd.) by an extruder, pulverized and classified to produce composite particles.

The shape of the composite particles produced was indeterminate, an average particle diameter was 33 μm, and the content of the magnetic particles was 80 wt %.

The composite particles were heat-treated in the same way as in Example 4 to produce magnetic particles XI which did not show a high electric conductivity.

When the electrically conductive magnetic particles XI were touched with the hand, they were easily broken.

Example 11

Figure 5:
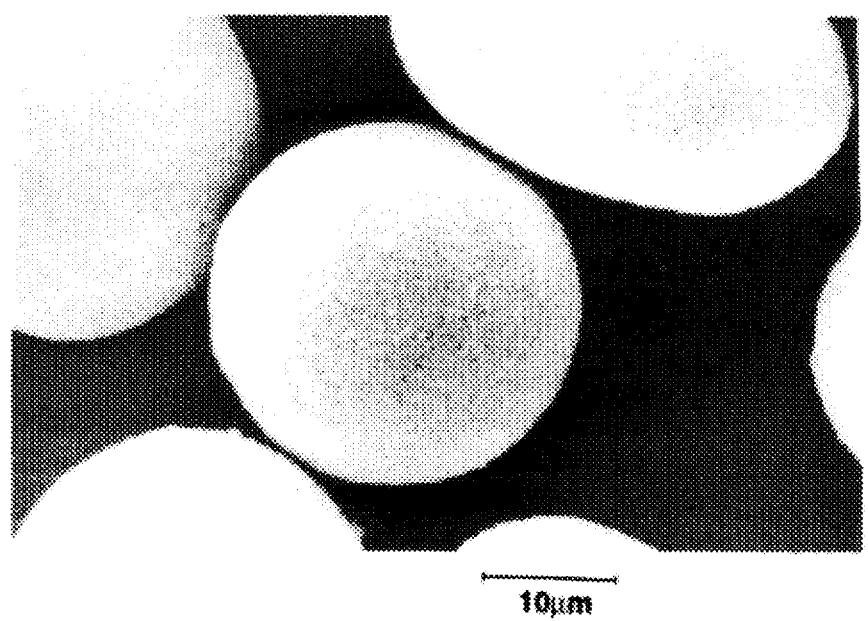
FIG. 5 is a scanning electron micrograph (×2000) showing the structure of the composite particles obtained in Example 11.

50 ml of water, 5.50 g of sodium hydroxide, 20 g of bisphenol A, 10 g of epichlorohydrin, 2.0 g of anhydrous phthalic acid, and 200 g of magnetite particles (average particle diameter: 0.24 μm) coated with 0.5 wt % of silane coupling agent (KBM-602, produced by Shin-etsu Chemical Industry Co., Ltd.) were charged into a 500-ml four-necked flask and stirred. After the temperature was raised to 80° C. at a rate of 1.0° to 1.5° C./min, the resultant mixture was further stirred at a temperature of 80° C. for 1.5 hours, thereby producing a composite material composed of the magnetic particles and a cured epoxy resin. The product was separated out by filtration, washed with water and dried, thereby obtaining composite particles (hereinunder referred to as "composite particles XII"). The composite particles XII obtained had an average particle diameter of 37.0 μm, and each particle had a spherical shape approximate to the complete spherical shape, as shown in the scanning electron micrograph (×2000) in FIG. 5.

The main production conditions and the properties of the composite particles XII are shown in Table 4.

Examples 12 and 13

Composite particles XIII and XIV were produced in the same way as in Example 11 except that the kind of the magnetic particles used, the kind and the amount of bisphenol, the kind and the amount of epichlorohydrin, the amount of sodium hydroxide, the kind and the amount of the curing agent and the amount of water were varied.

The main production conditions of the composite particles XIII and XIV are shown in Table 3 and the properties thereof are shown in Table 4.

<Heat-treatment of composite particles>

Examples 14 to 18

Example 14

1 kg of the composite particles XII obtained in Example 11 were charged into a rotary heat-treating furnace having a capacity of 10 liter, and the temperature of the interior was raised to 450° C. while causing nitrogen gas to flow therein at a rate of 1 liter/min. After one hour of heat-treatment, the temperature was cooled to room temperature and the product was taken out as spherical electrically conductive magnetic particles XV.

Figure 6:
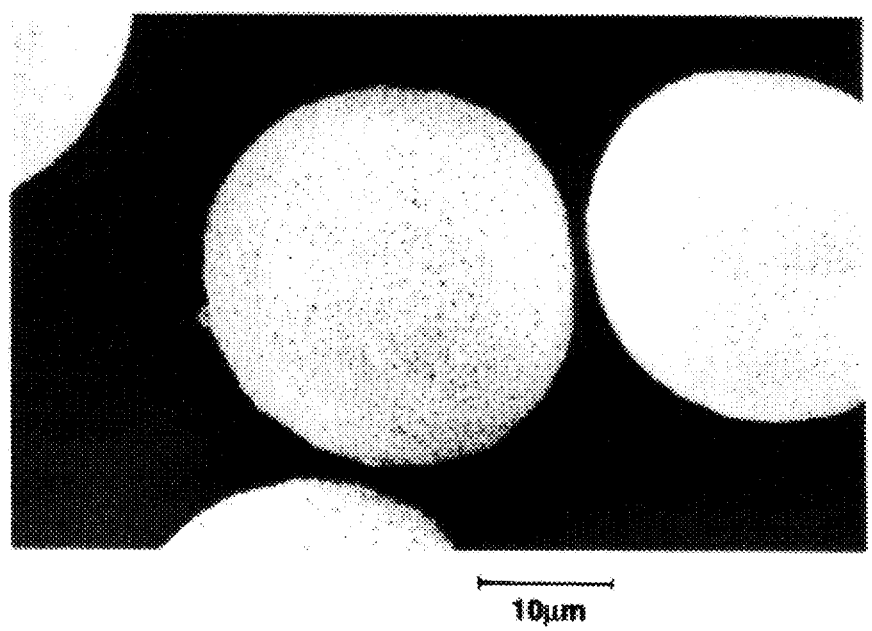
FIG. 6 is a scanning electron micrograph (×2000) showing the structure of the electrically conductive magnetic particles obtained in Example 14.

The average particle diameter of the electrically conductive magnetic particles XV was 35 μm, and each particle had a spherical shape (sphericity: 1.2) approximate to the complete spherical shape, as shown in the scanning electron micrograph (×2000) in FIG. 6.

The main production conditions and the properties of the obtained spherical magnetic particles XV are shown in Table 4.

50 g of the spherical electrically conductive magnetic particles XV were charged into a 100-cc glass bottle and capped, and the bottle was shaken for 3 hours by a paint conditioner (manufactured by RED DEVIL Limited). When the saturation magnetization and the conductivity of the particles after shaking were measured, the initial values were approximately maintained.

Since there were determined no epoxy resin from each of the thus-obtained spherical electrically conductive magnetic particles XV, it was proved that the epoxy resin in the composite particles was carbonized, completely.

Examples 15 to 18

Spherical magnetic particles XVI and XIX were produced in the same way as in Example 14 except that the composite particles XII to XIV produced in Examples 11 to 13, respectively were used and that the amount of composite particles used and the heat-treating conditions were varied.

The main production conditions and the properties of the spherical magnetic particles XVI and XIX are shown in Table 4.

Figure 7:
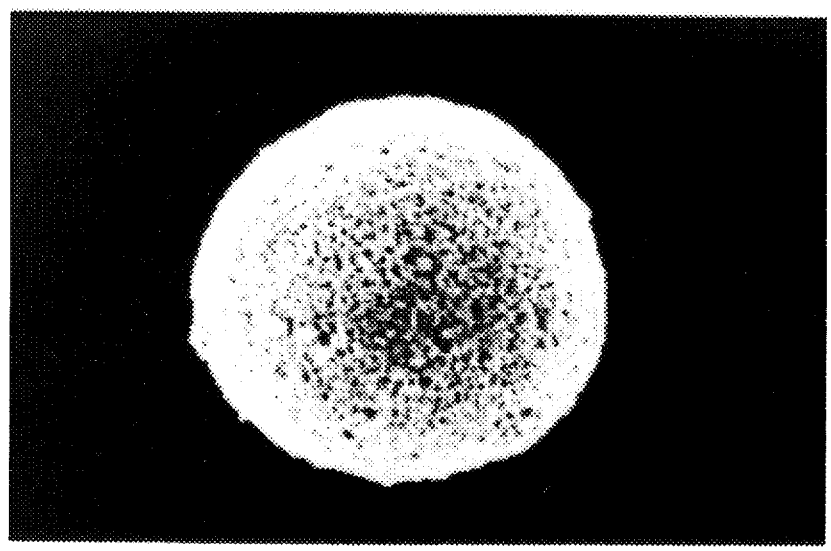
FIG. 7 is a scanning electron micrograph (×5000) showing the structure of the composite particles obtained in Example 15.

The scanning electron micrograph (×5000) of the spherical electrically conductive magnetic particles XVI produced in Example 15 is shown in FIG. 7.

Figure 8:
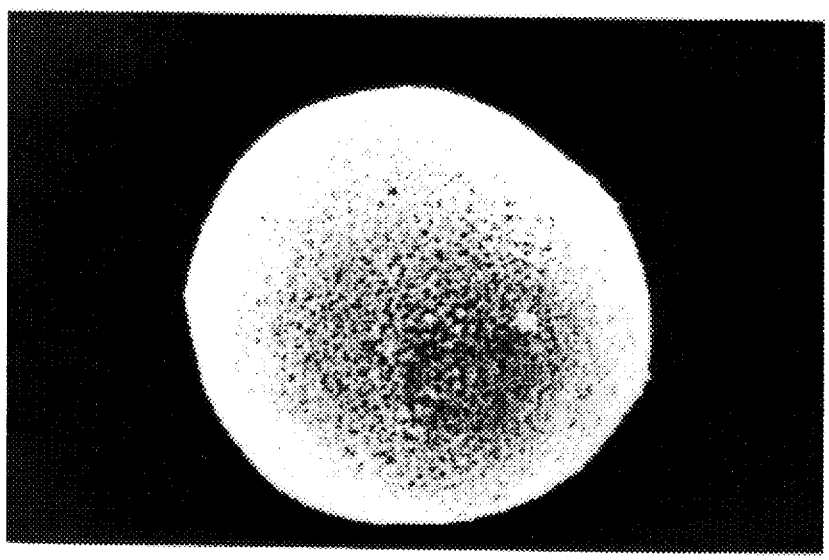
FIG. 8 is a scanning electron micrograph (×3500) showing the structure of the electrically conductive magnetic particles obtained in Example 17.

The scanning electron micrograph (×3500) of the spherical magnetic particles XVIII produced in the Example 17 is shown in FIG. 8.

Since there were determined no epoxy resin from each of the thus-obtained spherical electrically conductive magnetic particles XVI and XVII in the Examples 15 and 16, it was proved that the epoxy resin in each of the composite particles was carbonized, completely.

On the other hand, there was determined epoxy resin from each of the thus-obtained spherical magnetic particles XVIII and XIX in the Examples 17 and 18, it was proved that the epoxy resin in each of the composite particles was partially carbonized and the content of the remaining epoxy resin in each of the spherical magnetic particles was not more than 13 wt %.

Example 19

80 ml of water, 32 g of an uncured epoxy resin (EPICLON 850, produced by Dai-Nippon ink Chemical Industry Co., Ltd.), 3.0 g of piperidine, and 250 g of magnetite particles (average particle diameter: 0.24 μm) coated with 1.0 wt % of silane coupling agent (KBE 903, produced by Shin-etsu Chemical Industry Co., Ltd.) were charged into a 500-ml four-necked flask and stirred. After the temperature was raised to 80° C. at a rate of 1.0° to 1.5° C./min, the resultant mixture was further stirred at a temperature of 80° C. for 1.5 hours, thereby producing a composite material composed of the magnetic particles and the cured epoxy resin. The product was separated out by filtration, washed with water, and dried, thereby obtaining composite particles XX.

Spherical magnetic particles XXI were produced by the same heat-treatment as in Example 14. The main production conditions and the properties of the spherical magnetic particles XXI are shown in Table 4.

TABLE 1

| | Properties of composite particles | | | |
|---|---|---|---|---|
| | Magnetic particles | | | |
| | | Average particle | | Lipophilic treatment |
| Examples | Kind | diameter (μm) | Amount (g) | Kind | Amount (wt %) |
| Example 1 | Spherical magnetite | 0.24 | 400 | KBM-403 | 0.5 |
| Example 2 | Spherical magnetite | 0.24 | 400 | — | — |
| Example 3 | Spherical magnetite | 0.24 | 400 | KBM-602 | 0.75 |

TABLE 1 (II)

| | Production of composite particles | | | |
|---|---|---|---|---|
| | Basic catalyst | | Phenol | Formalin | Water |
| | Kind | Amount (g) | Amount (g) | Amount (g) | Amount (g) |
| Ex. 1 | Ammonia water | 12 | 40 | 60 | 40 |
| Ex. 2 | Ammonia water | 12 | 30 | 60 | 280 |
| Ex. 3 | Ammonia water | 12 | 40 | 60 | 60 |

TABLE 1 (III)

| | Properties of composite particles | | | | |
|---|---|---|---|---|---|
| | Average particle diameter (μm) | Shape | Content of magnetic particles (%) | Saturation magnetization (emu/g) | Conductivty (S/cm) | Particles produced |
| Ex. 1 | 35 | Spherical | 85.6 | 77 | $3 \times 10^{-9}$ | I |
| Ex. 2 | 5 | Spherical | 86.7 | 78 | $2 \times 10^{-9}$ | II |
| Ex. 3 | 280 | Spherical | 82.2 | 74 | $2 \times 10^{-9}$ | III |

TABLE 2

| Examples and Comparative Examples | Composite particles | Heat-treating conditions | | |
|---|---|---|---|---|
| | | Temperature (°C.) | Time (h) | $N_2$ flow rate (l/min) |
| Example 4 | I | 450 | 1 | 1 |
| Example 5 | II | 450 | 3 | 3 |
| Example 6 | I | 600 | 3 | 3 |
| Example 7 | III | 450 | 1 | 3 |
| Example 8 | I | 370 | 2 | 1 |
| Example 9 | II | 400 | 1 | 3 |
| Example 10 | III | 420 | 2 | 3 |
| Comparative Example 1 | — | 450 | 1 | 1 |

TABLE 2 (II)

| | Spherical magnetic particles | | | | |
|---|---|---|---|---|---|
| | Content of magnetic particles (wt %) | Carbon content (wt %) | Average particle diameter (μm) | Shape | Saturation magnetization (emu/g) |
| Ex. 4 | 92.1 | 7.9 | 35 | Spherical | 84 |
| Ex. 5 | 92.2 | 7.8 | 5 | Spherical | 81 |
| Ex. 6 | 92.2 | 7.8 | 34 | Spherical | 78 |
| Ex. 7 | 88.9 | 11.1 | 280 | Spherical | 80 |
| Ex. 8 | 89.0 | 2.0 | 32 | Spherical | 81 |
| Ex. 9 | 90.1 | 4.4 | 34 | Spherical | 82 |
| Ex. 10 | 91.2 | 4.2 | 250 | Spherical | 83 |
| Comp. Ex. 1 | 98.2 | 1.8 | — | Indeterminate | — |

TABLE 2 (III)

| | Spherical magnetic particles | | | | | |
|---|---|---|---|---|---|---|
| | Conductivity (S/cm) | Product | Strength (I) | Strength (II) (a−b)/a | Sphericity l/w | Remaining phenol resin |
| Ex. 4 | $3 \times 10^{-5}$ | IV | A | 0.05 | 1.0 | No |
| Ex. 5 | $2 \times 10^{-4}$ | V | A | 0.05 | 1.2 | No |
| Ex. 6 | $5 \times 10^{-3}$ | VI | A | 0.07 | 1.0 | No |
| Ex. 7 | $3 \times 10^{-3}$ | VII | A | 0.05 | 1.1 | No |
| Ex. 8 | $1 \times 10^{-6}$ | VIII | A | 0.03 | 1.1 | Yes (9.0 wt %) |
| Ex. 9 | $1 \times 10^{-5}$ | IX | A | 0.03 | 1.0 | Yes (5.5 wt %) |
| Ex. 10 | $2 \times 10^{-4}$ | X | A | 0.02 | 1.2 | Yes (4.6 wt %) |
| Comp. Ex. 1 | — | XI | C | — | — | — |

TABLE 3

| | Ferromagnetic particles | | | | |
|---|---|---|---|---|---|
| Examples | Kind | Average particle diameter (μm) | Amount (g) | Lipophilic treatment | |
| | | | | Kind | Amount (wt %) |
| Example 11 | Spherical magnetite | 0.23 | 200 | KBM-602 | 0.5 |
| Example 12 | Spherical magnetite | 0.23 | 200 | KBM-602 | 0.5 |
| Example 13 | Spherical magnetite | 0.23 | 200 | KBM-602 | 0.5 |

TABLE 3 (II)

| | Bisphenol A Amount (g) | Epichlorohydrin Amount (g) | Sodium hydroxide Amount (g) | Curing agent | |
|---|---|---|---|---|---|
| | | | | Kind | Amount (g) |
| Ex. 11 | 20.0 | 10.0 | 5.5 | Anhydrous phthalic acid | 2.0 |
| Ex. 12 | 20.0 | 10.0 | 5.5 | Anhydrous phthalic acid | 2.0 |
| Ex. 13 | 20.0 | 10.0 | 5.5 | Anhydrous phthalic acid | 2.0 |

TABLE 3 (III)

| | Water Amount (g) | Produced composite particles |
|---|---|---|
| Ex. 11 | 50 | XII |
| Ex. 12 | 60 | XIII |
| Ex. 13 | 70 | XIV |

TABLE 4 (I)

| Examples and Comparative Examples | Composite particles | Heat-treating conditions | | |
|---|---|---|---|---|
| | | Temperature (°C.) | Time (h) | $N_2$ flow rate (l/min) |
| Example 11 | — | — | — | — |
| Example 12 | — | — | — | — |
| Example 13 | — | — | — | — |
| Example 14 | XII | 450 | 1 | 1 |

TABLE 4 (I)-continued

| Examples and Comparative Examples | Composite particles | Heat-treating conditions | | |
|---|---|---|---|---|
| | | Temperature (°C.) | Time (h) | $N_2$ flow rate (l/min) |
| Example 15 | XIII | 450 | 3 | 3 |
| Example 16 | XII | 600 | 2 | 3 |
| Example 17 | XII | 400 | 1 | 2 |
| Example 18 | XIV | 370 | 2 | 3 |
| Example 19 | XX | 500 | 2 | 3 |

TABLE 4 (II)

Spherical magnetic (or composite) particles

| | Content of magnetic particles (wt %) | Carbon content (wt %) | Average particle diameter (μm) | Shape | Saturation magnetization (emu/g) | Conductivity (S/cm) |
|---|---|---|---|---|---|---|
| Ex. 11 | 82.2 | — | 37 | Spherical | 74 | $3 \times 10^{-9}$ |
| Ex. 12 | 82.2 | — | 13 | Spherical | 74 | $2 \times 10^{-9}$ |
| Ex. 13 | 84.4 | — | 8 | Spherical | 74 | $2 \times 10^{-9}$ |
| Ex. 14 | 92.2 | 7.8 | 35 | Spherical | 83 | $3 \times 10^{-5}$ |
| Ex. 15 | 91.1 | 8.9 | 13 | Spherical | 82 | $1 \times 10^{-4}$ |
| Ex. 16 | 92.5 | 7.5 | 27 | Spherical | 84 | $7 \times 10^{-3}$ |
| Ex. 17 | 90.7 | 3.4 | 36 | Spherical | 81 | $2 \times 10^{-6}$ |
| Ex. 18 | 90.0 | 2.8 | 8 | Spherical | 81 | $3 \times 10^{-6}$ |
| Ex. 19 | 91.7 | 8.3 | 25 | Spherical | 83 | $6 \times 10^{-4}$ |

TABLE 4 (III)

Spherical magnetic (or composite) particles

| | Charge on toner (μc/g) | Product | Strength (I) | Strength (II) (a–b)/a | Sphericity l/w | Remaining epoxy resin |
|---|---|---|---|---|---|---|
| Ex. 11 | −35.0 | XII | — | — | — | No |
| Ex. 12 | — | XIII | — | — | — | No |
| Ex. 13 | — | XIV | — | — | — | No |
| Ex. 14 | −17.0 | XV | A | 0.05 | 1.2 | No |
| Ex. 15 | — | XVI | A | 0.07 | 1.2 | No |
| Ex. 16 | — | XVII | A | 0.05 | 1.1 | No |
| Ex. 17 | −22.0 | XVIII | A | 0.05 | 1.1 | Yes (5.9 wt %) |
| Ex. 18 | — | XIX | A | 0.03 | 1.3 | Yes (7.2 wt %) |
| Ex. 19 | — | XXI | A | 0.03 | 1.2 | No |

What is claimed is:

1. Spherical magnetic composite particles comprising 80 to 98 wt % of magnetic particles, 2 to 15 wt % of carbon derived from carbonizing thermosetting resin in composite particles composed of the magnetic particles and the thermosetting resin, and not more than 13 wt % of residue of the thermosetting resin after carbonizing; wherein said spherical magnetic composite particles have an average particle diameter of 1 to 1000 μm, a conductivity in a direct current field to which a voltage of 15 volts is applied of $10^{-6}$ to $10^{-3}$ S/cm and a strength represented by the following formula:

$$(a-b)/a<0.1$$

wherein b represents an average particle diameter of said spherical magnetic composite particles measured by a laser diffraction particle size distribution analyzer after charging 50 g of the spherical magnetic composite particles into a 100 ml glass bottle, capping the bottle, and shaking the bottle for 60 minutes in a paint conditioner, and a represents an average particle diameter of said spherical magnetic composite particles measured by the laser diffraction particle size distribution analyzer before the shaking.

2. Spherical magnetic composite particles according to claim 1, wherein said thermosetting resin is selected from the group consisting of a phenol resin and an epoxy resin.

3. Spherical magnetic composite particles according to claim 1, wherein the average particle diameter of each of said magnetic particles is 0.1 to 10 μm.

4. Spherical magnetic composite particles according to claim 1, having a saturation magnetization of 40 to 150 emu/g.

5. Spherical magnetic composite particles according to claim 4, comprising 85 to 98 wt % of said magnetic particles and 2 to 15 wt % of said carbon which is produced by carbonizing said thermosetting resin.

6. Spherical magnetic composite particles according to claim 4, wherein said thermosetting resin is selected from the group consisting of a phenol resin and an epoxy resin.

7. Spherical magnetic composite particles according to claim 4, wherein the average particle diameter of each of said magnetic particles is 0.1 to 10 μm.

8. Spherical magnetic composite particles according to claim 1, wherein a sphericity of said spherical magnetic composite particles is represented by the following formula:

$$1.0 < l/w \leq 1.4$$

wherein l represents a major axial diameter of one composite particle measured by using an SEM photograph of at least 200 composite particles and w represents a minor axial diameter of one composite particle measured by using an SEM photograph of at least 200 composite particles.

* * * * *